(12) United States Patent
Chieco et al.

(10) Patent No.: US 6,785,832 B2
(45) Date of Patent: Aug. 31, 2004

(54) PROCESS INDEPENDENT SOURCE SYNCHRONOUS DATA CAPTURE APPARATUS AND METHOD

(75) Inventors: Leonard R. Chieco, Hopewell Junction, NY (US); Louis T. Fasano, Poughkeepsie, NY (US); Michael A. Sorna, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 09/887,792

(22) Filed: Jun. 22, 2001

(65) Prior Publication Data

US 2002/0199125 A1 Dec. 26, 2002

(51) Int. Cl.[7] .................................................. G06F 1/12
(52) U.S. Cl. .................... 713/401; 713/500; 713/501; 713/600; 326/93
(58) Field of Search ................................. 713/401, 500, 713/501, 600; 326/93

(56) References Cited

U.S. PATENT DOCUMENTS

| | | | |
|---|---|---|---|
| 5,621,739 A | | 4/1997 | Sine et al. |
| 5,706,484 A | | 1/1998 | Mozdzen et al. |
| 5,723,995 A | | 3/1998 | Mozdzen et al. |
| 5,729,152 A | | 3/1998 | Leung et al. |
| 5,768,529 A | | 6/1998 | Nikel et al. |
| 5,774,001 A | | 6/1998 | Mozdzen et al. |
| 5,794,020 A | | 8/1998 | Tanaka et al. |
| 5,933,459 A | * | 8/1999 | Saunders et al. ............ 375/317 |
| 6,031,847 A | | 2/2000 | Collins et al. |
| 6,311,285 B1 | * | 10/2001 | Rodriguez et al. .......... 713/401 |
| 6,430,697 B1 | * | 8/2002 | Muljono ...................... 713/600 |
| 6,452,421 B2 | * | 9/2002 | Saito ............................. 326/93 |
| 6,611,936 B2 | * | 8/2003 | Jue et al. ..................... 714/741 |
| 6,629,250 B2 | * | 9/2003 | Kopser et al. ............... 713/401 |
| 6,636,979 B1 | * | 10/2003 | Reddy et al. ................ 713/503 |
| 6,640,277 B1 | * | 10/2003 | Moertl ......................... 710/305 |
| 6,700,409 B2 | * | 3/2004 | Parkin .......................... 326/93 |
| 6,724,846 B1 | * | 4/2004 | Lo ............................... 375/354 |

FOREIGN PATENT DOCUMENTS

EP     1150224 A2 * 10/2001    ........... G06F/17/50

OTHER PUBLICATIONS

L.P. Andrews, G.T. Davis, R.J. Millas and O.E. Ortega; "Synchronous External Bus Architecture," IBM Technical Disclosure Bulletin vol. 36 No. 1 Jan. 1993, pp. 104–107.

* cited by examiner

Primary Examiner—A. Elamin
(74) Attorney, Agent, or Firm—Lisa Ulrich; Cantor Colburn LLP

(57) ABSTRACT

An apparatus for capturing a data signal sent from a transmitting source to a receiving element, the data signal being accompanied by a first clock signal in a source synchronous system. In an exemplary embodiment, the apparatus comprises a delay element having an input coupled to the first clock signal and an output producing a delayed first clock signal. The delay element further includes a plurality of delay latches, having a second clock signal as a clock input thereto, the second clock signal having a frequency which is a multiple of the frequency of the first clock signal. The data signal is captured by the receiving element when the receiving element is triggered by an edge of the delayed first clock signal.

24 Claims, 3 Drawing Sheets

PROCESS INDEPENDENT SOURCE SYNCHRONOUS DATA CAPTURE APPARATUS AND METHOD

BACKGROUND

The present invention relates generally to data processing systems and, more particularly, to an apparatus and method for capturing source synchronous data.

With the advent of high-speed, parallel data interfaces, traditional edge clocking techniques of providing "setup and hold" around a capturing clock edge have proven to be increasingly more difficult to implement. As a result, source synchronous designs have been utilized to reduce the variations in timing interface between communicating components in a computer system.

In source synchronous clocking, the data and clock signals are initially synchronized at the transmitting logic components, thus eliminating from the transmitting logic components the burden of accurately centering a clock edge within a "data valid region". However, various processing and environmental conditions can cause the clock edge to be skewed relative to the data at the receiving logic, thereby resulting in an uncertainty of the relationship between data and clock. The positioning of the clock within the data valid region has thus become the responsibility of the receiving components. Such accurate positioning can be difficult to achieve due to the wide range of process variations and the effect they have on circuit delays.

During the transmission of data, a data cycle is defined wherein the first segment of the data cycle represents a "data uncertainty region", with the remaining segment of the data cycle representing a "data valid region". Ideally, the edge (rising or falling) of the clock signal should arrive at some point during the data valid window segment of the data cycle to ensure the correct capture of data by the receiving component. Accordingly, the clock signal may be intentionally delayed until after the data uncertainty region has passed. Unfortunately, the delay elements traditionally used to correctly position the clock signal edge also have process variations introduced therein. These process variations can cause the delay elements to vary by as much as ±50%, and result in the clock edge arriving too early (i.e., during the data uncertainty region of the present data cycle) or too late (i.e., during the data uncertainty window of the next data cycle). In such a situation, the whole purpose of implementing a clock signal delay element would be defeated.

BRIEF SUMMARY

The above discussed and other drawbacks and deficiencies of the prior art are overcome or alleviated by an apparatus for capturing a data signal sent from a transmitting source to a receiving element, the data signal being accompanied by a first clock signal in a source synchronous system. In an exemplary embodiment, the apparatus comprises a delay element having an input coupled to the first clock signal and an output producing a delayed first clock signal. The delay element further includes a plurality of delay latches, having a second clock signal as a clock input thereto, the second clock signal having a frequency which is a multiple of the frequency of the first clock signal. The data signal is captured by the receiving element when the receiving element is triggered by an edge of the delayed first clock signal.

In preferred embodiment of the invention, the apparatus includes a first stage of four parallel connected delay latches, each of the first stage of four parallel connected delay latches having an input coupled to the first clock signal. A second stage of four parallel connected delay latches is also included, with each of the second stage of four parallel connected delay latches having an input coupled to a corresponding output of the first stage of four parallel connected delay latches. Each of the four parallel connected delay latches within the first and second stages has a second clock frequency of 2.5 times the frequency of the first clock signal, with the second clock signal being applied to each delay latch 90 degrees out of phase with respect to one another in the first and second stages.

BRIEF DESCRIPTION OF THE DRAWINGS

Referring to the exemplary drawings wherein like elements are numbered alike in the several Figures.

DETAILED DESCRIPTION

Figure 1:
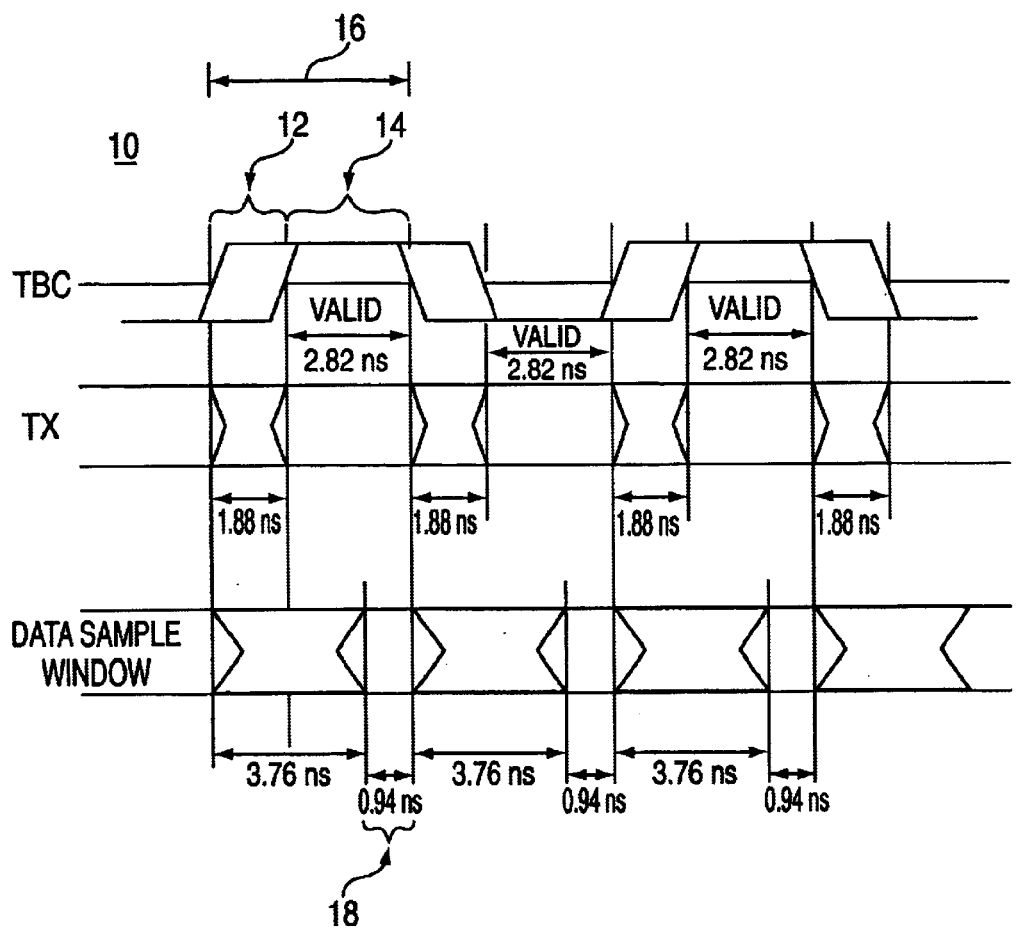
FIG. 1 is a timing diagram illustrating the relationship between clock and data signals, the clock and data signals initially being synchronized at a transmitting source.

Referring to FIG. 1, there is shown a timing diagram 10 which illustrates the relationship between clock (TBC) and data (TX) signals in a source synchronous system, the signals being synchronized at the transmitting logic. In the example shown, the signals are transmitted within a source synchronous application such as a 2 gigabit/second Fibre Channel physical layer to link layer communication.

As the synchronous data (TX) and clock (TBC) signals are propagated to their intended destination (receiving logic), a timing skew may occur as indicated earlier. The timing diagram 10 illustrates a "clock skew region" or a "data uncertainty region" 12, and a "data valid region" 14 within a defined data cycle period 16. For the application illustrated, the data cycle period 16 is 4.7 nanoseconds (ns), during which time 10 bits of data are transmitted. Within a given data cycle, therefore, a first portion of the 4.7 ns represents the "data uncertainty region" 12 and the remaining portion of the 4.7 ns represents the "data valid region" 14. As an alternative to expressing these regions in units of nanoseconds, they may also be expressed in terms of bit times of delay, wherein a bit time is defined as:

Bit Time=Data Cycle Time/# of bits transmitted per Data Cycle

For the above example, then, one bit time equals 4.7 ns÷10=0.47 ns, where each bit time represents 10% of the entire data cycle. In the 2 gigabit/second application, the data uncertainty region 12 is the first four bit times of the data cycle (1.88 ns), while the data valid region 14 is the last six bit times of the data cycle (2.82 ns).

Due to the timing skew of the clock signal edge, it is assumed from a design standpoint that the edge may arrive anywhere from the beginning of the data uncertainty region 12 to the end of the data uncertainty region 12. If the clock edge arrives early with respect to the data signal (TX), then the data must be captured no sooner than 4 bit times (1.88 ns) after the clock edge in order to ensure the data is captured within the data valid region 14. Conversely, if the clock edge arrives late with respect to the data signal, then the data must be captured no later than 6 bit times (2.88 ns) after the clock edge. Therefore, a data capture window 18 of 2 bit times (2.88 ns–1.88 ns–0.94 ns) is established in which the data should be captured. From a design standpoint, it is desirable to capture the data at the midpoint of the data valid region 14, or at about 5 bit times (2.35 ns) after the clock edge.

Figure 2:
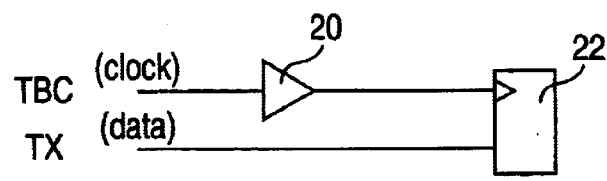
FIG. 2 is a schematic diagram of an existing delay circuit element used for delaying a clock signal, the clock signal used to center a clock within a data valid region.

Referring now to FIG. 2, a simplified schematic illustrates an existing approach for introducing the 5 bit time (2.35 ns) delay for the clock signal. A delay element 20, such as an analog signal buffer, is coupled between the clock signal (TBC) and a receiving element 22. The receiving element 22, for example, may comprise a data capture latch (such as a D flip-flop), which receives the data signal. Hereinafter, the term "data capture latch" is used interchangeably with "receiving element".

As mentioned previously, however, the shortcoming of the approach shown in FIG. 2 lies in the process variations of the delay element 20. For example, a ±50% variation in the delay time of the clock edge could result in a large delay of about 7.5 bit times (3.5 ns) or a small delay of about 2.5 bit times (1.18 ns). In either case, the data could end up being captured in the data uncertainty region of the present data cycle or the data uncertainty region of the next data cycle. This being the case, the entire purpose of introducing a delay element 20 for the clock signal (TBC) is defeated.

Figure 3:
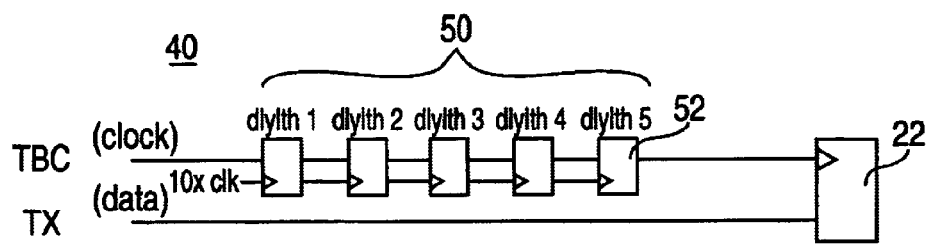
FIG. 3 is a schematic diagram illustrating an apparatus for capturing a data signal sent from a transmitting source to a receiving element, the apparatus including a delay element, according to one embodiment of the invention.

One possible solution to the aforementioned drawbacks is shown in FIG. 3. In lieu of the delay element 20 of FIG. 2, an apparatus 40 features an improved delay element 50, comprising a plurality of edge-triggered delay latches 52 (designated individually by "dlylth" 1 through 5) serially connected between the original first clock signal (TBC) and the data capture latch 22. Each delay latch 52 is triggered by a second clock signal designated by "10×clk", the frequency of which is ten times faster than the original first clock signal (TBC). In essence, the original first clock signal (TBC) becomes a data signal to be propagated through the plurality of delay latches 52. By the time the original first clock signal (TBC) is propagated through the delay latches 52 and is received by the data capture latch 22, enough time has passed so that data capture latch 22 captures the data signal within the data valid region 14 of the data cycle. In a preferred embodiment, the delay latches 52 are D flip-flops.

Because "10×clk" operates ten times faster than the original first clock signal (TBC), each successive delay latch 52 therefore provides a one bit time (0.47 ns) delay as the original first clock signal (TBC) is propagated therethrough. Recalling that the minimum delay needed to bypass the data uncertainty region 12 of the present data cycle 16 is 4 bit times (1.88 ns), a minimum of four delay latches 52 (triggered by "10×clk") are therefore used. However, since "10×clk" and the first original clock signal (TBC) are asynchronous, a fifth delay latch (dlylth 5) is used to compensate for that factor. Thus, the overall delay produced by delay latches 52 will be between 4–5 bit times (1.88 ns–2.32 ns), depending upon the initial relationship between the original first clock signal (TBC) and "10×clk" at the first delay latch (dlylth 1).

Figure 4:
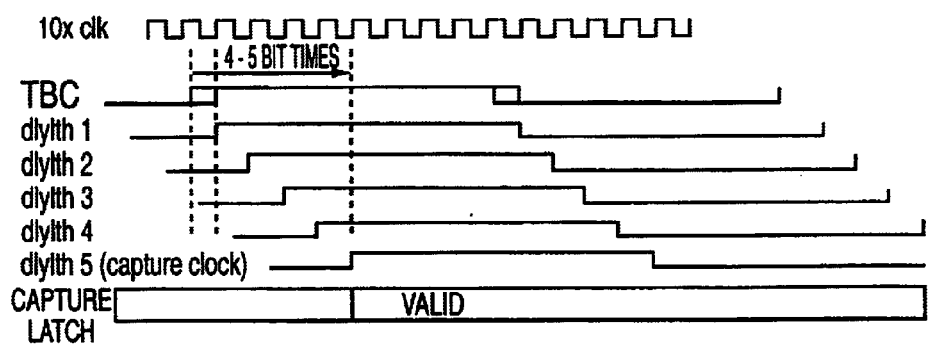
FIG. 4 is a timing diagram illustrating the characteristics of the delay element and apparatus shown in FIG. 4.

FIG. 4 is a timing diagram which illustrates the delay of the first original clock signal (TBC) as applied to the data capture latch 22 when using the delay latches 52 shown in FIG. 3. As can be seen, a 4–5 bit time delay of the original first clock signal (TBC) is sufficient to ensure that the data signal (TX) is not captured during the data uncertainty region 12. In addition, the potential problem of an "over delay" is also avoided. While there may be some process variations associated with the final stage of the delay latches 52, they are an order of magnitude smaller than the delay of the final stage itself. As such, the overall processing variations may cause a variation in time delay of about 300 picoseconds (ps).

Figure 5:
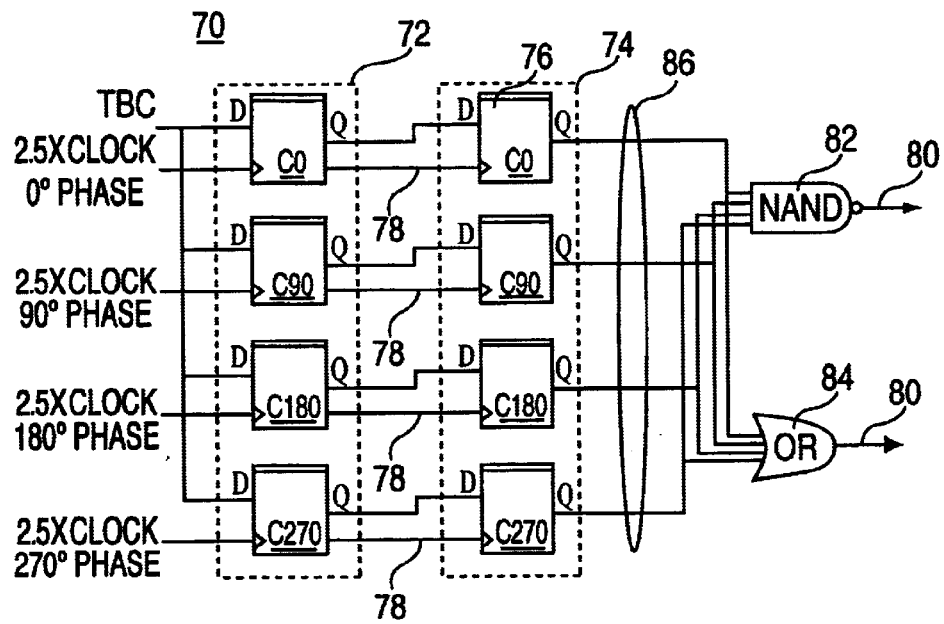
FIG. 5 is a schematic diagram of an alternative embodiment of the delay element and apparatus in FIG. 3.

Although the embodiment of the apparatus 40 shown in FIG. 3 alleviates the aforementioned drawbacks of the existing delay element 20 in FIG. 2, the use of a 10×clock may, in some cases, be relatively costly to implement. Therefore, in accordance with a preferred embodiment of the invention, an alternative delay element 70 is shown in FIG. 5. As a substitute for serially connected delay latches 52 operated by a 10×clock, delay element 70 employs a configuration of two stages 72, 74 of parallel delay latches 76. Each individual latch 76 within a given stage of parallel delay latches are clocked out of phase with one another. The phase relationship, the operational clock frequency, and the number of the parallel delay latches 76 used is determined by the number of bit times needed for the desired time delay. For an "N" bit time delay, then, each stage 72, 74 will have N latches 76 connected in parallel, while the operational clock frequency thereof will be 10/N times the original first clock speed. Finally, the N parallel latches 76 in a given stage 72, 74 will each be clocked 360/N degrees out of phase with one another.

For a 4 bit time delay, therefore, there are 4 parallel connected latches in each stage. The operational clock frequency of each latch 76 is 2.5 times the original clock frequency, with each clock signal being 90 degrees out of phase with one another. It will thus be appreciated that, rather than a having single delay latch sampling the original clock signal (data) once every bit time, four delay latches sample the data every four bit times. But, since each of the four delay latches 76 are 90 degrees out of phase with one another, the net effect is that the data is sampled every bit time. The second stage 74 of parallel latches, connected in series with the first stage 76 of parallel latches, is used to provide the minimum bit-time separation for a data capturing clock signal sent directly to the data capturing latch 22. For example, if the 180° clock signal were to catch the incoming original clock signal edge, the output of the second stage delay latch triggered by the 180° clock signal captures the desired 4 bit time delayed signal. It should also be noted that each latch in the second stage 74 of delay element 70 is triggered by a clock signal 78 propagated through the corresponding phase latch in the first stage.

A final delayed clock signal 80 may be generated by a four-input NAND gate 82 or a four-input OR gate 84, both of which are depicted in FIG. 5. In either case, the four inputs to the particular gate used are the outputs 86 of the four second stage 74 parallel delay latches 76. The NAND gate 82 provides data capture at the falling edge of the original clock signal (TBC), while the OR gate 84 provides data capture at the rising edge of the original clock signal (TBC). Depending upon which edge of the clock signal is desired to trigger data capture, either the NAND gate 82 or the OR gate 84 may be used.

Figure 6:
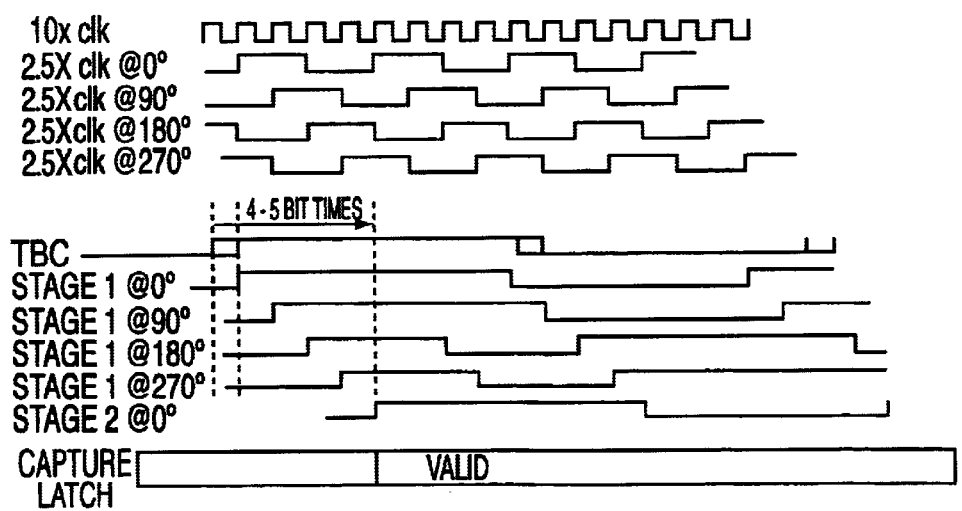
FIG. 6 is a timing diagram illustrating the characteristics of the delay element and apparatus shown in FIG. 5.

FIG. 6 is a timing diagram which illustrates the delay performance of delay element 70 in FIG. 5. From the top part of FIG. 6, it is seen how a 4-phase clock operating at 2.5 times the speed of the original clock is a functional equivalent of a single phase clock operating at 10 times the speed of the original clock. Recalling that a 10× clock provides a rising (or falling) edge once every bit time, this function is also achieved once every bit time by one of the four phases. Finally, as shown in the bottom portion of FIG. 6, the desired delay in this instance is realized when the clock signal of the 0° phase latch of the second stage 74 is triggered 4–5 bit times after the original clock signal (TBC), thus ensuring the data is ultimately captured during the data valid window. It should be noted that any of the four phases of the 2.5×clock signal may be the one which produces the 4–5 bit time delay, depending upon the skew (if any) of the original clock signal (TBC).

From the foregoing description, it is seen that by taking advantage of the precise nature of the time delay inherent in a clocked memory element (i.e., a latch), a more reliable delay element may be utilized when compensating for process variations in receiving logic. And, if the cost of using high speed clocks becomes a concern, it is also seen how a slower speed clock may be used in an alternative delay element scheme, as illustrated by the embodiment of FIG. 5.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for capturing a data signal sent from a transmitting source to a receiving element, the data signal being accompanied by a first clock signal in a source synchronous system, the apparatus comprising:

a delay element, said delay element having an input coupled to the first clock signal and an output, said output producing a delayed first clock signal, said delay element further comprising a plurality of delay latches; and said plurality of delay latches having a second clock signal as a clock input thereto, said second clock signal having a frequency which is a multiple of the frequency of the first clock signal;

wherein the data signal is captured by the receiving element when the receiving element is triggered by an edge of said delayed first clock signal.

2. The apparatus of claim 1, wherein:

said plurality of delay latches are serially connected; and the frequency of said second clock signal is 10 times the frequency of the first clock signal.

3. The apparatus of claim 1, wherein said delay element further comprises:

a first stage of N parallel connected delay latches, each of said first stage of N parallel connected delay latches having an input coupled to the first clock signal;

a second stage of N parallel connected delay latches, each of said second stage of N parallel connected delay latches having an input coupled to a corresponding output of said first stage of N parallel connected delay latches; and each of said N parallel connected delay latches within said first and second stages having a second clock frequency of 10/N times the frequency of the first clock signal, with said second clock signal being applied to each delay latch 360/N degrees out of phase with respect to one another in said first and second stages.

4. The apparatus of claim 3, wherein N is equal to 4.

5. The apparatus of claim 1, wherein said plurality of delay latches comprises D flip-flops.

6. The apparatus of claim 4, wherein said delayed first clock signal comprises a final delayed clock signal, said final delayed clock signal generated from outputs of said second stage of parallel connected delay latches.

7. The apparatus of claim 6, further comprising:

a NAND gate, said NAND gate having inputs connected to said outputs of said second stage of parallel connected delay latches;

wherein an output of said NAND gate comprises said final delayed clock signal.

8. The apparatus of claim 7, wherein said NAND gate provides capture of the data signal at a rising edge of the first clock signal.

9. The apparatus of claim 6, further comprising:

an OR gate, said OR gate having inputs connected to said outputs of said second stage of parallel connected delay latches;

wherein an output of said OR gate comprises said final delayed clock signal.

10. The apparatus of claim 1, wherein said OR gate provides capture of the data signal at a falling edge of the first clock signal.

11. A method for capturing a data signal sent from a transmitting source to a receiving element, the data signal being accompanied by a first clock signal in a source synchronous system, the method comprising:

coupling the data signal to the receiving element;

propagating the first clock signal through a delay element, thereby producing a delayed first clock signal, said delay element further comprising a plurality of delay latches, said plurality of delay latches each having:

the first clock signal as a data input thereto; and a second clock signal as a clock input thereto, said second clock signal having a frequency which is a multiple of the frequency of the first clock signal; and coupling said delayed first clock signal to the receiving element;

wherein the data signal is captured by the receiving element when the receiving element is triggered by an edge of said delayed first clock signal.

12. The method of claim 11, further comprising:

defining a data cycle, said data cycle having a period corresponding to the amount of time lapsing before a selected number of bits is transmitted by the transmitting source;

defining a data uncertainty region within said data cycle, said data uncertainty region corresponding to a period of time within said data cycle in which the validity of the data signal within said data uncertainty region is not established; and defining a data valid region within said data cycle, said data valid region corresponding to a period of time within said data cycle in which the validity of the data signal within said data valid region is established;

wherein the data signal is captured by the receiving element within said data valid region.

13. The method of claim 12, further comprising:

defining a bit time, said bit time being defined as said data cycle period divided by said selected number of bits transmitted by the transmitting source during said data cycle;

wherein said data cycle period is equivalent to 10 bit times.

14. The method of claim 13, wherein:

said data uncertainty region comprises the first four bit times of said data cycle; and said data valid region comprises the last six bit times of said data cycle.

15. The method of claim 14, wherein:

said delayed first clock signal produced by said delay element is delayed from said first clock signal by about 4 to 5 bit times.

16. The method of claim 15, wherein:

said plurality of delay latches are serially connected; and the frequency of said second clock signal is 10 times the frequency of the first clock signal.

17. The method of claim 15, wherein said delay element further comprises:

a first stage of N parallel connected delay latches, each of said first stage of N parallel connected delay latches having an input coupled to the first clock signal;

a second stage of N parallel connected delay latches, each of said second stage of N parallel connected delay latches having an input coupled to a corresponding output of said first stage of N parallel connected delay latches; and each of said N parallel connected delay latches within said first and second stages having a second clock frequency of 10/N times the frequency of the first clock signal, with said second clock signal being applied to each delay latch 360/N degrees out of phase with respect to one another in said first and second stages.

18. The method of claim 17, wherein N is equal to 4.

19. The method of claim 15, wherein said plurality of delay latches comprises D flip-flops.

20. The method of claim 19, wherein said delayed first clock signal comprises a final delayed clock signal, said final delayed clock signal generated from outputs of said second stage of parallel connected delay latches.

21. The method of claim 20, further comprising:

connecting a NAND gate, to said outputs of said second stage of parallel connected delay latches;

wherein an output of said NAND gate comprises said final delayed clock signal.

22. The method of claim 21, wherein said NAND gate provides capture of the data signal at a rising edge of the first clock signal.

23. The method of claim 20, further comprising:

connecting an OR gate to said outputs of said second stage of parallel connected delay latches;

wherein an output of said OR gate comprises said final delayed clock signal.

24. The method of claim 23, wherein said OR gate provides capture of the data signal at a falling edge of the first clock signal.

* * * * *